(12) United States Patent
Nakajima

(10) Patent No.: US 11,446,964 B2
(45) Date of Patent: Sep. 20, 2022

(54) TYRE

(71) Applicant: SUMITOMO RUBBER INDUSTRIES, LTD., Hyogo (JP)

(72) Inventor: Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 482 days.

(21) Appl. No.: 16/360,234

(22) Filed: Mar. 21, 2019

(65) Prior Publication Data
US 2019/0322141 A1    Oct. 24, 2019

(30) Foreign Application Priority Data

Apr. 18, 2018   (JP) .............................. JP2018-080116

(51) Int. Cl.
*B60C 11/13*      (2006.01)
*B60C 11/11*      (2006.01)
*B60C 11/03*      (2006.01)

(52) U.S. Cl.
CPC .......... *B60C 11/13* (2013.01); *B60C 11/1315* (2013.01); *B60C 2011/0365* (2013.01); *B60C 2011/0367* (2013.01); *B60C 2011/1338* (2013.01)

(58) Field of Classification Search
CPC . B60C 11/13; B60C 11/1315; B60C 11/0358; B60C 11/1392; B60C 11/0323; B60C 11/1384; B60C 11/0316; B60C 11/0309
See application file for complete search history.

(56) References Cited

U.S. PATENT DOCUMENTS

| | | | |
|---|---|---|---|
| 5,503,207 A * | 4/1996 | Ochiai ................ | B60C 11/0309 152/209.21 |
| 2005/0167021 A1* | 8/2005 | Takahashi ............... | B60C 11/13 152/209.15 |
| 2008/0121325 A1* | 5/2008 | Durand ................... | B60C 11/13 152/209.18 |

(Continued)

FOREIGN PATENT DOCUMENTS

| | | | |
|---|---|---|---|
| DE | 102010017010 A1 * | 11/2011 | ............. B60C 11/11 |
| GB | 1549347 A * | 8/1979 | ......... B60C 11/0309 |

(Continued)

OTHER PUBLICATIONS

DE 1020100017010 A1 Machine Translation; Rittweger, Stefan (Year: 2011).*

(Continued)

*Primary Examiner* — Robert C Dye
*Assistant Examiner* — Nicholas J Weiler
(74) *Attorney, Agent, or Firm* — Greenblum & Bernstein, P.L.C.

(57) ABSTRACT

A tyre includes a tread portion having a tread surface provided with grooves extending in a tyre axial direction. The grooves each include an opening formed on the tread surface, a minimum portion located inwardly in a tyre radial direction of the opening and having a groove width being locally minimum, and a maximum portion located inwardly in the tyre radial direction of the minimum portion and having a groove width being locally maximum in a region inwardly in the tyre radial direction of the opening.

14 Claims, 6 Drawing Sheets

(56) References Cited

U.S. PATENT DOCUMENTS

| | | | | |
|---|---|---|---|---|
| 2010/0258228 A1* | 10/2010 | De Benedittis | ......... | B60C 11/13 |
| | | | | 152/209.21 |
| 2015/0336431 A1* | 11/2015 | Kaneko | ................. | B60C 11/11 |
| | | | | 152/209.24 |
| 2017/0136827 A1* | 5/2017 | Sato | ................... | B60C 11/1392 |
| 2017/0190220 A1* | 7/2017 | Ishibashi | ............ | B60C 11/0302 |
| 2018/0312006 A1* | 11/2018 | Bonnet | .................. | B60C 11/04 |
| 2020/0307322 A1* | 10/2020 | Ishihara | ................. | B60C 11/03 |

FOREIGN PATENT DOCUMENTS

| | | | | | |
|---|---|---|---|---|---|
| JP | 62286803 | A | * 12/1987 | .......... | B60C 11/042 |
| JP | H05338412 | A | * 12/1993 | .......... | B60C 11/042 |
| JP | 2003159911 | A | * 6/2003 | ........ | B60C 11/1281 |
| JP | 2017509531 | A | 4/2017 | | |
| JP | 2017105347 | A | * 6/2017 | .......... | B60C 11/042 |
| KR | 20130050014 | A | * 5/2013 | | |

OTHER PUBLICATIONS

KR 20130050014 Machine Translation; Park, Hae-Yong (Year: 2013).*
JP H05338412 Machine Translation; Miura, Yasushi (Year: 1993).*
JP 62286803 Machine Translation, Tsukagoshi, Tetsuto (Year: 1987).*
JP 2017105347 Machine Translation; Kataoka,Yuji (Year: 2017).*

* cited by examiner 3  5  8  4

TYRE

BACKGROUND ART

Field of the Disclosure

The present disclosure relates to tyres, more particularly to a tyre capable of improving uneven wear resistance and grip performance in a well-balanced manner.

Description of the Related Art

Conventionally, tyres which include improved cross-sectional shapes of grooves have been proposed. For example, the following Patent document 1 discloses a tyre tread provided with lateral cuts which include first part and ducts located radially inside the first parts in order to improve performance when the tread has worn down.

PATENT DOCUMENT

[Patent document 1] Japanese Unexamined Patent Application Publication 2017-509531

SUMMARY OF THE DISCLOSURE

Unfortunately, the tyre disclosed in Patent document 1, due to the ducts provided inside the tread portion, tends to reduce in stiffness of the tread portion, resulting in deterioration of uneven wear resistance and grip performance.

The present disclosure has been made in view of the above circumstances and has a major object to provide tyres capable of improving uneven wear resistance and grip performance in a well-balanced manner.

According to one aspect of the disclosure, a tyre includes a tread portion having a tread surface provided with grooves extending in a tyre axial direction. Each groove includes an opening formed on the tread surface, a minimum portion located inwardly in a tyre radial direction of the opening and having a groove width being locally minimum, and a maximum portion located inwardly in the tyre radial direction of the minimum portion and having a groove width being locally maximum in a region inwardly in the tyre radial direction of the opening.

In another aspect of the disclosure, each groove may include a groove bottom portion located innermost in the tyre radial direction, and a minimum distance in the tyre radial direction between the minimum portion and the maximum portion may be greater than a minimum distance in the tyre radial direction between the maximum portion and the groove bottom portion.

In another aspect of the disclosure, a groove width of the opening may be greater than the groove width of the maximum portion.

In another aspect of the disclosure, a minimum distance in the tyre radial direction between the minimum portion and the opening may be smaller than a minimum distance in the tyre radial direction between the minimum portion and the maximum portion.

In another aspect of the disclosure, a minimum distance in the tyre radial direction between the minimum portion and the opening may be smaller than a minimum distance in the tyre radial direction between the maximum portion and a groove bottom portion.

In another aspect of the disclosure, a minimum distance in the tyre radial direction between the minimum portion and the opening may be equal to or less than 40% of a minimum distance in the tyre radial direction between the opening and a groove bottom portion.

In another aspect of the disclosure, each groove may include a groove bottom portion located innermost in the tyre radial direction, and the groove bottom portion is located on a center of a curved surface curved protruding inwardly in the tyre radial direction.

In another aspect of the disclosure, a region from the opening to the minimum portion of each groove may be formed by a pair of inclined surfaces inclined with respect to the tyre radial direction.

In another aspect of the disclosure, the pair of inclined surfaces each may be one or more planes.

In another aspect of the disclosure, the pair of the inclined surfaces may be a curved surface.

In another aspect of the disclosure, the pair of inclined surfaces may include one or more planes and a curved surface.

In another aspect of the disclosure, each groove may be a lateral groove in communication with a tread edge of the tread portion.

DESCRIPTION OF THE PREFERRED EMBODIMENTS

An embodiment of the present disclosure will be explained below with reference to the accompanying drawings.

Figure 1:
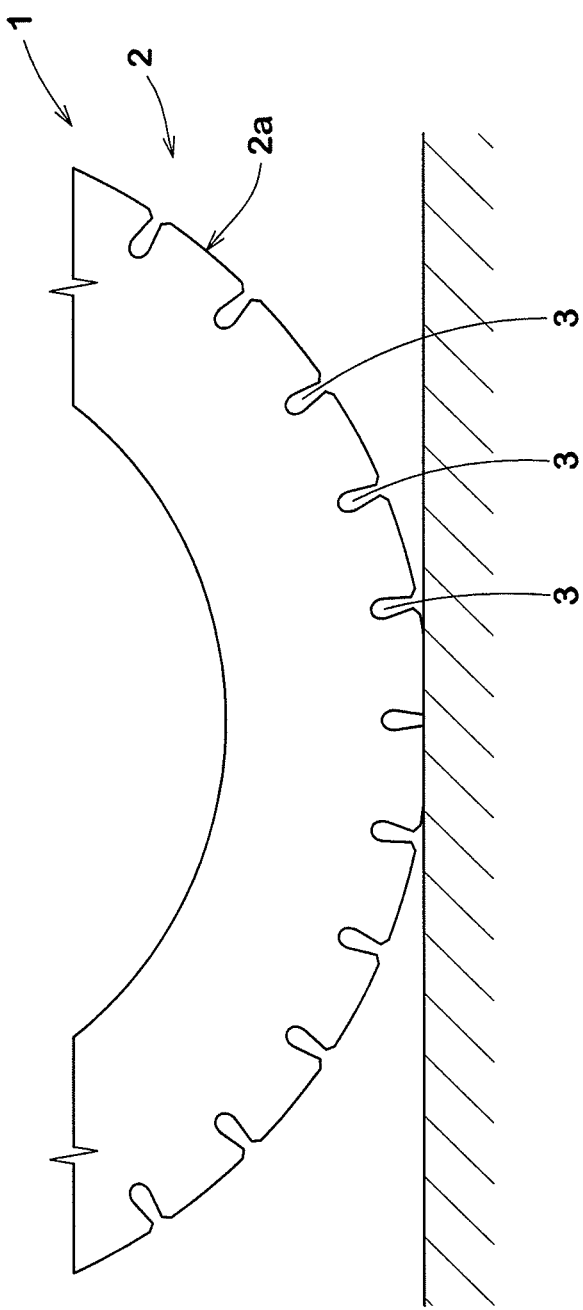
FIG. 1 is a side view of a tyre according to an embodiment of the present disclosure.

FIG. 1 illustrates a side view of a tyre 1 according to an embodiment.

The tyre 1 according to the present disclosure can be used for various kinds of tyres, e.g., pneumatic tyres for passenger car and heavy-duty vehicle, and non-pneumatic tyres that can support the tyre load by structural members without being inflated with a pressurized air. As illustrated in FIG. 1, the tyre 1 according to the embodiment includes a tread portion 2 having a tread surface 2a provided with grooves 3 extending in the tyre axial direction.

Figure 2:
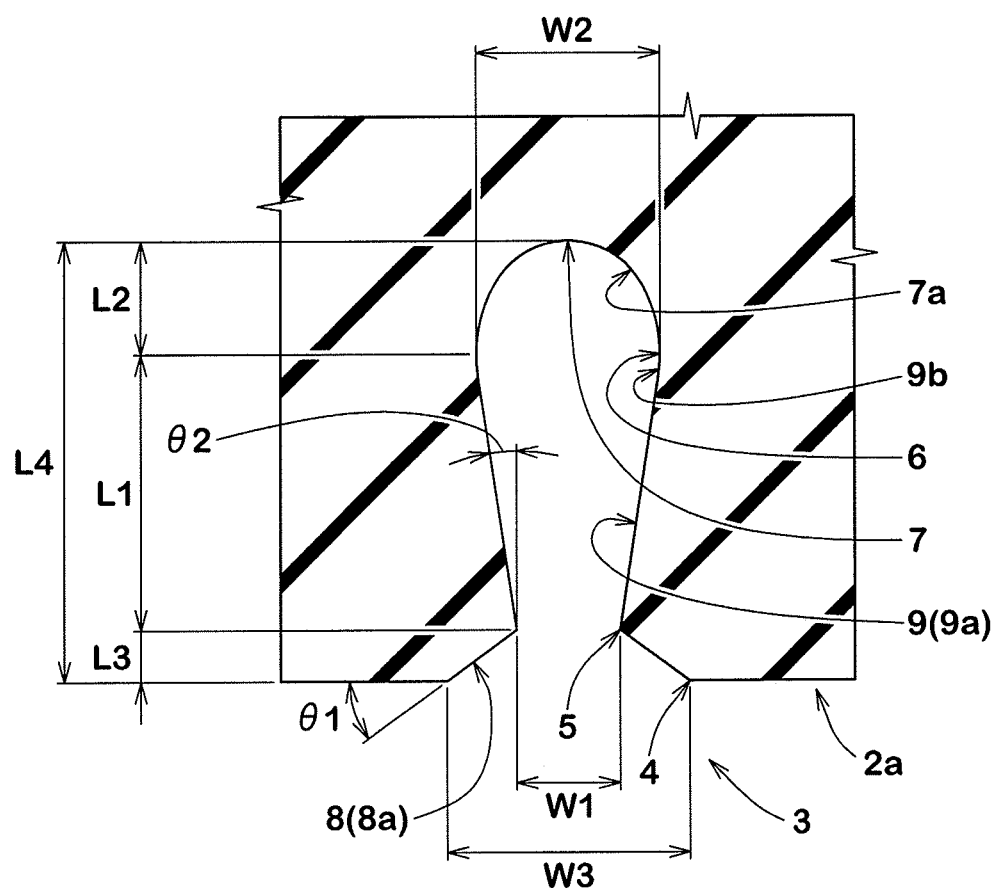
FIG. 2 is a cross-sectional view of a groove.

FIG. 2 is a cross-sectional view of one groove 3. As illustrated in FIG. 2, each groove 3 includes an opening 4 formed on the tread surface 2a, a minimum portion 5 located inwardly in the tyre radial direction of the opening 4, and a maximum portion 6 located inwardly in the tyre radial direction of the minimum portion 5. The minimum portion 5 is a portion having a groove width W1 which is locally minimum.

The maximum portion 6 is a portion having a groove width W2 which is locally maximum in a region inwardly in the tyre radial direction of the opening 4.

As used herein, dimensions of respective portions of the tyre 1 are values measured under a normal state unless otherwise noted. As used herein, the normal state is such that the tyre 1, when the tyre 1 is a pneumatic tyre, is mounted on a standard wheel rim with a standard pressure but is loaded with no tyre load.

The standard wheel rim is a wheel rim officially approved for each tyre by standards organizations on which the tyre 1 is based, wherein the standard wheel rim is the "standard rim" specified in JATMA, the "Design Rim" in TRA, and the "Measuring Rim" in ETRTO, for example.

The standard pressure is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

Figure 3:
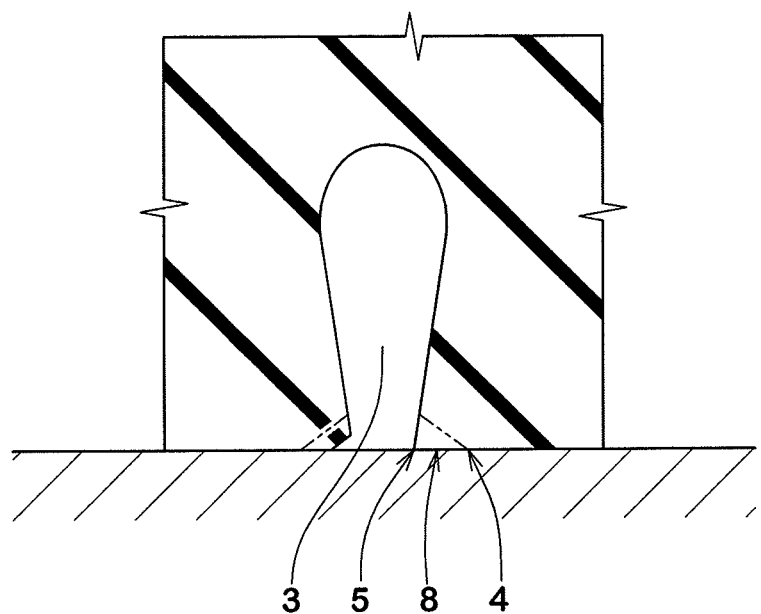
FIG. 3 is a cross-sectional view of the groove upon grounding.

FIG. 3 illustrates a cross-sectional view of the groove 3 upon grounding. As illustrated in FIG. 3, the groove 3 can moderate braking load by a region between the opening 4 and the minimum portion 5, improving uneven wear resistance of the tyre 1. In addition, the minimum portion 5, due to braking load, approaches the ground and then comes into contact with it, and thus a ground contact area of the tyre 1 increases so as to improve grip performance. In addition, the maximum portion 6, due to its large cross-sectional area, can maintain flexibility thereof appropriately, improving uneven wear resistance of the tyre 1 further.

As illustrated in FIG. 2, in some preferred embodiments, each groove 3 includes a groove bottom portion 7 located innermost thereof in the tyre radial direction. It is preferable that the minimum distance L1 in the tyre radial direction between the minimum portion 5 and the maximum portion 6 is greater than the minimum distance L2 in the tyre radial direction between the maximum portion 6 and the groove bottom portion 7. In such a tyre 1, since the maximum portion 6 is located inwardly in the tyre radial direction of the center location of a region between the minimum portion 5 and the groove bottom portion 7, reduction in stiffness due to the maximum portion 6 can be suppressed, and thus grip performance of the tyre 1 can be improved.

In the present embodiment, the minimum distance L3 in the tyre radial direction between the minimum portion 5 and the opening 4 is smaller than the minimum distance L1 in the tyre radial direction between the minimum portion 5 and the maximum portion 6. Further, it is preferable that the minimum distance L3 in the tyre radial direction between the minimum portion 5 and the opening 4 is smaller than the minimum distance L2 in the tyre radial direction between the maximum portion 6 and the groove bottom portion 7. Such a groove 3 can maintain stiffness of the tyre 1 within a proper range, improving uneven wear resistance and grip performance in a high level.

Preferably, the minimum distance L3 in the tyre radial direction between the minimum portion 5 and the opening 4 is equal to or less than 40% of the minimum distance L4 in the tyre radial direction between the opening 4 and the groove bottom portion 7. Note that the minimum distance L4 between the opening 4 and the groove bottom portion 7 corresponds to a groove depth of the groove 3. When the minimum distance L3 between the minimum portion 5 and the opening 4 is more than 40% of the minimum distance L4 between the opening 4 and the groove bottom portion 7, braking load tends to act on the opening 4 locally, and thus uneven wear resistance of the tyre 1 may not be improved.

In the present embodiment, a groove width W3 of the opening 4 is greater than the groove width W2 of the maximum portion 6. Such an opening 4 can increase the groove width difference between the minimum portion 5 and the opening 4 while maintaining the minimum distance L3 between the minimum portion 5 and the opening 4. Thus, the groove 3 can disperse braking load, improving uneven wear resistance of the tyre 1.

In the present embodiment, a region from the opening 4 to the minimum portion 5 of each groove 3 is formed by a pair of inclined surfaces 8 inclined with respect to the tyre radial direction. Thus, the region has a groove width decreasing continuously in the tyre radial direction from the opening 4 to the minimum portion 5. In the present embodiment, the pair of inclined surfaces 8 each consists of a single plane 8a. Such an inclined surface 8 can come into contact with the ground appropriately (shown in FIG. 3) by receiving braking load, resulting in increase of a ground contact area of the tyre 1 so that grip performance of the tyre 1 is improved.

Preferably, the plane 8a of each inclined surface 8 has an angle $\theta 1$ of from 5 to 30 degrees with respect to the tread surface 2a. When the angles $\theta 1$ of the inclined surface 8 is less than 5 degrees, braking load tends to act on the minimum portion 5 locally, and there is a risk that uneven wear resistance of the tyre 1 does not improve. When the angle $\theta 1$ of the inclined surface 8 is more than 30 degrees, braking load tends to act on the opening 4 locally, and there is a risk that uneven wear resistance of the tyre 1 does not improve.

In the present embodiment, a region from the minimum portion 5 to the maximum portion 6 of each groove 3 is formed by a pair of internal inclined surfaces 9 inclined with respect to the tyre radial direction. In the present embodiment, the pair of internal inclined surfaces 9 includes a plane 9a and a curved surface 9b such that a groove width increases from the minimum portion 5 to the maximum portion 6 continuously. Such a groove 3 can make the groove width W2 of the maximum portion 6 wider while maintaining stiffness of the tyre 1, improving uneven wear resistance and grip performance of the tyre in a high level.

Preferably, the plane 9a of each internal inclined surface 9 is inclined at an angle $\theta 2$ of from 5 to 25 degrees with respect to the tyre radial direction. When the angle $\theta 2$ of plane 9a of each internal inclined surface 9 is less than 5 degrees, the groove width W2 of the maximum portion 6 becomes small, and thus there is a risk that uneven wear resistance of the tyre 1 may not improve. When the angle $\theta 2$ of plane 9a of each internal inclined surface 9 is more than 25 degrees, stiffness of the tyre 1 tends decrease, and thus there is a risk that grip performance of the tyre may not improve.

A region from the maximum portion 6 to the groove bottom portion 7 of the groove 3 according to the embodiment is configured as a curved surface 7a curving in the groove width direction. Preferably, the groove bottom portion 7 is located on the middle position of the curved surface 7a in the groove width direction. Thus, the groove 3 according to the embodiment, has the deepest groove depth at the middle position in the groove width direction of the groove. Note that the deepest groove depth of the groove 3 is the minimum distance L4 in the tyre radial direction between the opening 4 and the groove bottom portion 7. Such a groove 3 can maintain stiffness of the tyre 1, thus improving grip performance of the tyre 1.

Figure 4:
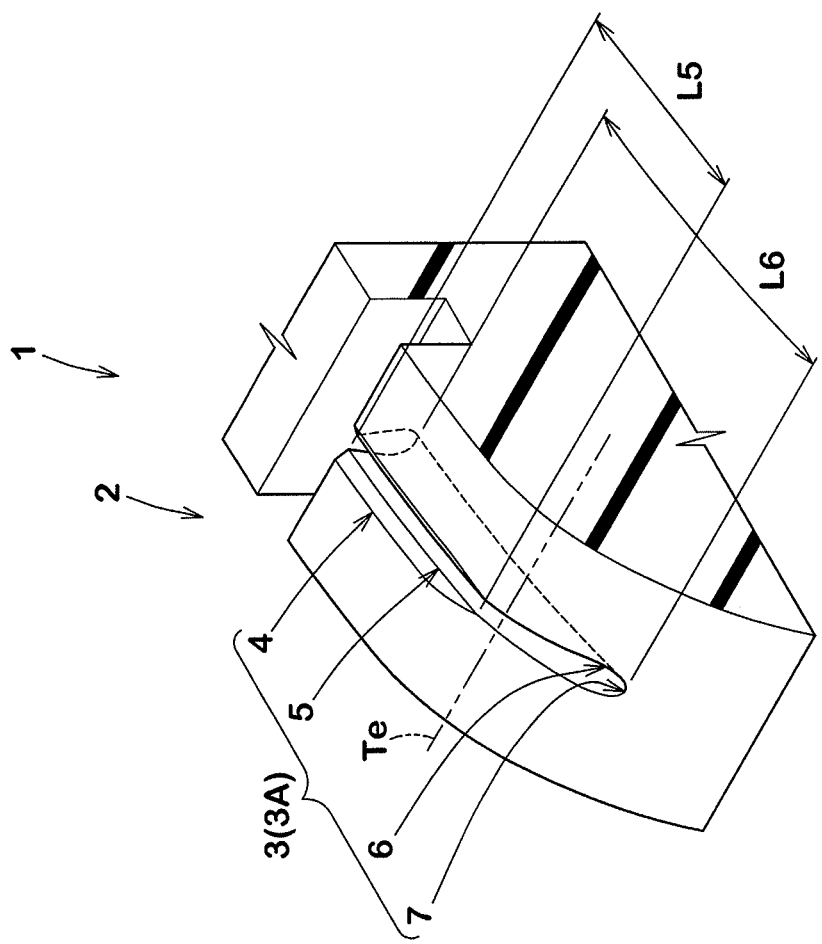
FIG. 4 is a perspective view of the groove.

FIG. 4 illustrates a perspective view of the groove 3. As illustrated in FIG. 4, each groove 3 is configured as a lateral groove 3A that opens at a tread edge Te of the tread portion 2. Preferably, length L5 in the tyre axial direction of the minimum portion 5 is equal to or more than 70% of a length L6 in the tyre axial direction of the lateral groove 3A. Note that the length L6 in the tyre axial direction of the lateral groove 3A is a length in the tyre axial direction of the groove bottom portion 7. Such a groove 3 can provide a large ground contact length of the minimum portion 5 when braking, uneven wear resistance and grip performance of the tyre 1 can further be improved.

As illustrated in FIG. 2 and FIG. 4, the minimum portion 5 and the maximum portion 6 preferably extend with respective constant groove widths W1 and W2 in the longitudinal direction of the groove 3. Such a groove 3 can maintain uniform stiffness of the tyre 1 in the longitudinal direction of the groove 3, improving grip performance of the tyre 1 further.

Figure 5:
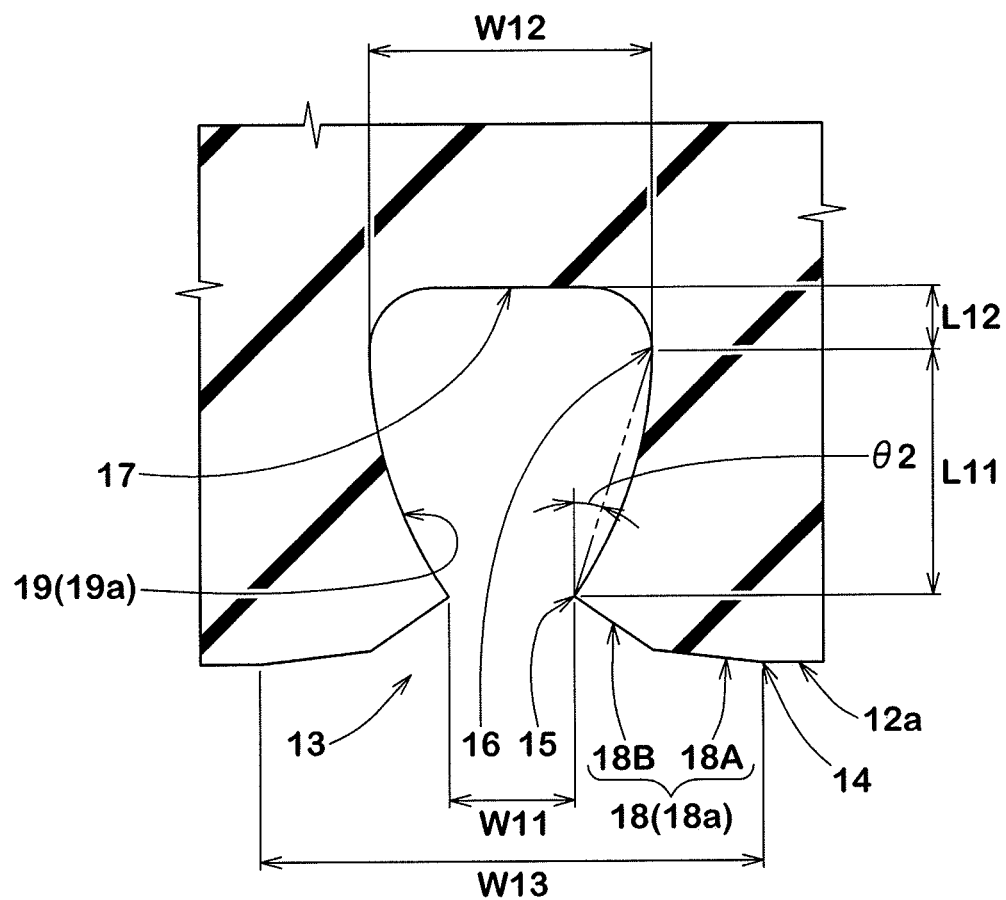
FIG. 5 is a cross-sectional view of the groove according to another embodiment.

FIG. 5 illustrates a cross-sectional view of each groove 13 according to another embodiment. As illustrated in FIG. 5, the groove 13 according to the embodiment includes the opening 14 formed on the tread surface 12a, the minimum portion 15 located inwardly in the tyre radial direction of the opening 14, and the maximum portion 16 located inwardly in the tyre radial direction of the minimum portion 15. The minimum portion 15 is a portion having a groove width W11 which is locally minimum. The maximum portion 16 is a portion having a groove width W12 which is locally maximum in a region inwardly in the tyre radial direction of the opening 14.

In this embodiment, the groove 13 includes the groove bottom portion 17 located innermost in the tyre radial direction of the groove. Preferably, the minimum distance L11 in the tyre radial direction between the minimum portion 15 and the maximum portion 16 is greater than the minimum distance L12 in the tyre radial direction between the maximum portion 16 and the groove bottom portion 17. Even in the present embodiment, it is preferable that the groove width W13 of the opening 14 is greater than the groove width W12 of the maximum portion 16. Such a groove 13, the same as described the groove 3, can improve uneven wear resistance and grip performance of the tyre 1 in a well-balance manner.

In this embodiment, a region from the opening 14 to the minimum portion 15 of the groove 13 is formed by a pair of inclined surfaces 18 inclined with respect to the tyre radial direction. In the present embodiment, the pair of inclined surfaces 18 each includes two planes 18a. Each inclined surface 18, for example, consists of a first plane 18A extending from the opening 14 and a second plane 18B extending from the minimum portion 15 which are different in angle with respect to the tread surface 12a. Such an inclined surface 18 can disperse braking load effectively, improving uneven wear resistance of the tyre 1 further.

In the present embodiment, a region from the minimum portion 15 to the maximum portion 16 of each groove 13 is formed by a pair of internal inclined surfaces 19 inclined with respect to the tyre radial direction. In the present embodiment, each internal inclined surface 19 consists of a curved surface 19a. An angle θ2 of each internal inclined surface 19, for example, is defined as an angle relative to the tyre radial direction of a straight line connecting the minimum portion 15 and the maximum portion 16. Such a groove 13 can make the groove width W12 of the maximum portion 16 wider while maintaining stiffness of the tyre 1, improving uneven wear resistance and grip performance of the tyre in a high level, resulting in improving both uneven wear resistance and grip performance of the tyre.

Figure 6:
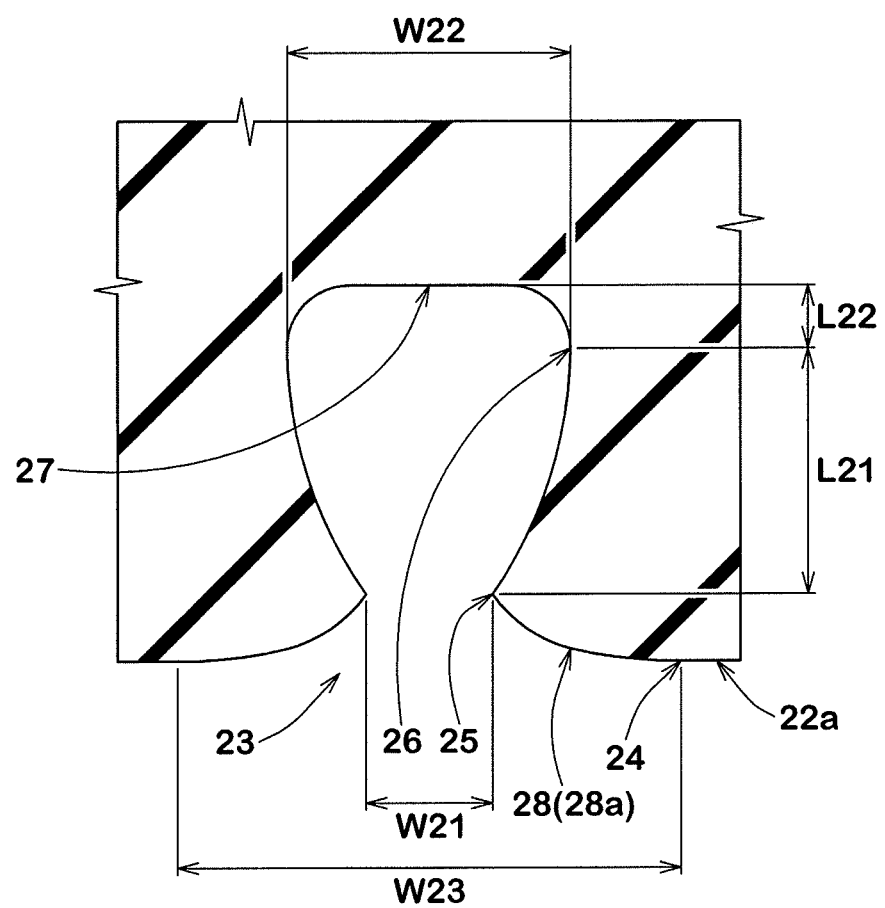
FIG. 6 is a cross-sectional view of the groove according to yet another embodiment.

FIG. 6 illustrates a cross-sectional view of yet another embodiment of each groove 23. As illustrated in FIG. 6, the groove 23 according to the embodiment includes the opening 24 formed on the tread surface 22a, the minimum portion 25 located inwardly in the tyre radial direction of the opening 24, and the maximum portion 26 located inwardly in the tyre radial direction of the minimum portion 25. The minimum portion 25 is a portion having a groove width W21 which is locally minimum. The maximum portion 26 is a portion having a groove width W22 which is locally maximum in a region inwardly in the tyre radial direction of the opening 24.

In this embodiment, the groove 23 includes the groove bottom portion 27 located innermost in the tyre radial direction of the groove. Preferably, the minimum distance L21 in the tyre radial direction between the minimum portion 25 and the maximum portion 26 is greater than the minimum distance L22 in the tyre radial direction between the maximum portion 26 and the groove bottom portion 27. Even in the present embodiment, it is preferable that the groove width W23 of the opening 24 is greater than the groove width W22 of the maximum portion 26. Such a groove 23, the same as described the groove 3, can improve uneven wear resistance and grip performance of the tyre 1 in a well-balanced manner.

In this embodiment, a region from the opening 24 to the minimum portion 25 of the groove 23 is formed by a pair of inclined surfaces 28 inclined with respect to the tyre radial direction. In the present embodiment, the pair of inclined surfaces 28 consists of a curved surface 28a. Such an inclined surface 28 can disperse braking load effectively, improving uneven wear resistance of the tyre 1 further.

Alternatively, the inclined surfaces 28, for example, may be configured to include a plane (not illustrated) and a curved surface. Such an inclined surface 28, the same as described the groove 3, can disperse braking load effectively, improving uneven wear resistance of the tyre 1 further.

While the particularly preferable embodiments in accordance with the present disclosure have been described in detail, the present disclosure is not limited to the illustrated embodiments, but can be modified and carried out in various aspects.

What is claimed is:

1. A tyre comprising:
 a tread portion having a tread surface provided with grooves extending in a tyre axial direction; and
 each groove comprising
 an opening formed on the tread surface,
 a minimum portion located inwardly in a tyre radial direction of the opening and having a groove width being locally minimum, and
 a maximum portion located inwardly in the tyre radial direction of the minimum portion and having a groove width being locally maximum in a region inwardly in the tyre radial direction of the opening, wherein
 each groove comprises a groove bottom portion located innermost in the tyre radial direction, and a minimum distance in the tyre radial direction between the minimum portion and the maximum portion is greater than a minimum distance in the tyre radial direction between the maximum portion and the groove bottom portion,
 a groove width of each groove varies in the tyre radial direction continuously from the opening to the maximum portion,
 a groove width of the opening is greater than the groove width of the maximum portion, and
 each groove is a lateral groove in communication with a tread edge of the tread portion, wherein a region from the opening to the minimum portion of each groove is formed by a pair of inclined surfaces inclined with respect to the tyre radial direction, and the pair of the inclined surfaces is a curved surface.

2. The tyre according to claim 1, wherein
a minimum distance in the tyre radial direction between the minimum portion and the opening is smaller than a minimum distance in the tyre radial direction between the minimum portion and the maximum portion.

3. The tyre according to claim 1, wherein
a minimum distance in the tyre radial direction between the minimum portion and the opening is smaller than a minimum distance in the tyre radial direction between the maximum portion and a groove bottom portion.

4. The tyre according to claim 1, wherein
a minimum distance in the tyre radial direction between the minimum portion and the opening is equal to or less than 40% of a minimum distance in the tyre radial direction between the opening and a groove bottom portion.

5. The tyre according to claim 1, wherein
each groove comprises a groove bottom portion located innermost in the tyre radial direction, and
the groove bottom portion is located on a center of a curved surface curved protruding inwardly in the tyre radial direction.

6. The tyre according to claim 1, wherein
the curved surface protrudes outwardly in the tyre radial direction.

7. The tyre according to claim 1, wherein
the region has a groove width decreasing continuously in the tyre radial direction from the opening to the minimum portion of each groove.

8. The tyre according to claim 7, wherein
a region from the minimum portion to the maximum portion has a groove width increasing continuously in the tyre radial direction from the minimum portion to the maximum portion.

9. The tyre according to claim 1, wherein
a groove width of each groove varies in the tyre radial direction continuously from the opening to a groove bottom portion.

10. A tyre comprising:
a tread portion having a tread surface provided with grooves extending in a tyre axial direction; and
each groove comprising
an opening formed on the tread surface,
a minimum portion located inwardly in a tyre radial direction of the opening and having a groove width being locally minimum, and
a maximum portion located inwardly in the tyre radial direction of the minimum portion and having a groove width being locally maximum in a region inwardly in the tyre radial direction of the opening, wherein
each groove comprises a groove bottom portion located innermost in the tyre radial direction, and a minimum distance in the tyre radial direction between the minimum portion and the maximum portion is greater than a minimum distance in the tyre radial direction between the maximum portion and the groove bottom portion,
a region from the opening to the minimum portion of each groove is formed by a pair of inclined surfaces inclined with respect to the tyre radial direction,
the pair of the inclined surfaces is a curved surface,
a groove width of the opening is greater than the groove width of the maximum portion, and
each groove is a lateral groove in communication with a tread edge of the tread portion.

11. The tyre according to claim 10, wherein
a minimum distance in the tyre radial direction between the minimum portion and the opening is smaller than a minimum distance in the tyre radial direction between the minimum portion and the maximum portion.

12. A tyre comprising:
a tread portion having a tread surface provided with grooves extending in a tyre axial direction; and
each groove comprising
an opening formed on the tread surface,
a minimum portion located inwardly in a tyre radial direction of the opening and having a groove width being locally minimum, and
a maximum portion located inwardly in the tyre radial direction of the minimum portion and having a groove width being locally maximum in a region inwardly in the tyre radial direction of the opening, wherein
each groove comprises a groove bottom portion located innermost in the tyre radial direction, and a minimum distance in the tyre radial direction between the minimum portion and the maximum portion is greater than a minimum distance in the tyre radial direction between the maximum portion and the groove bottom portion,
a region from the opening to the minimum portion of each groove is formed by a pair of inclined surfaces inclined with respect to the tyre radial direction,
the pair of the inclined surfaces is a curved surface, and
a minimum distance in the tyre radial direction between the minimum portion and the opening is smaller than a minimum distance in the tyre radial direction between the minimum portion and the maximum portion.

13. A tyre comprising:
a tread portion having a tread surface provided with grooves extending in a tyre axial direction; and
each groove comprising
an opening formed on the tread surface,
a minimum portion located inwardly in a tyre radial direction of the opening and having a groove width being locally minimum, and
a maximum portion located inwardly in the tyre radial direction of the minimum portion and having a groove width being locally maximum in a region inwardly in the tyre radial direction of the opening, wherein
each groove comprises a groove bottom portion located innermost in the tyre radial direction, and a minimum distance in the tyre radial direction between the minimum portion and the maximum portion is greater than a minimum distance in the tyre radial direction between the maximum portion and the groove bottom portion,
a groove width of each groove varies in the tyre radial direction continuously from the opening to the maximum portion,
a groove width of the opening is greater than the groove width of the maximum portion, and
each groove is a lateral groove in communication with a tread edge of the tread portion, wherein
a region from the opening to the minimum portion of each groove is formed by a pair of inclined surfaces inclined with respect to the tyre radial direction, and
the pair of inclined surfaces includes one or more planes and a curved surface.

14. A tyre comprising:
a tread portion having a tread surface provided with grooves extending in a tyre axial direction; and
each groove comprising an opening formed on the tread surface,
a minimum portion located inwardly in a tyre radial direction of the opening and having a groove width being locally minimum, and
a maximum portion located inwardly in the tyre radial direction of the minimum portion and having a groove width being locally maximum in a region inwardly in the tyre radial direction of the opening, wherein
each groove comprises a groove bottom portion located innermost in the tyre radial direction, and a minimum distance in the tyre radial direction between the minimum portion and the maximum portion is greater than a minimum distance in the tyre radial direction between the maximum portion and the groove bottom portion,
a groove width of each groove varies in the tyre radial direction continuously from the opening to the maximum portion,
a groove width of the opening is greater than the groove width of the maximum portion, and
each groove is a lateral groove in communication with a tread edge of the tread portion, wherein
the pair of inclined surfaces each is one or more planes, and
the pair of inclined surfaces each consists of two planes.

* * * * *